US012767458B2

(12) United States Patent
Mujumdar et al.

(10) Patent No.: US 12,767,458 B2
(45) Date of Patent: Oct. 20, 2026

(54) TRANSFER SYSTEMS AND METHODS

(71) Applicant: INTELLIGRATED HEADQUARTERS, LLC, Mason, OH (US)

(72) Inventors: Kishor Mujumdar, Charlotte, NC (US); Ravi Jain, Charlotte, NC (US); Aravind Raj Soundhararaj, Charlotte, NC (US); Sharath Kumar, Charlotte, NC (US)

(73) Assignee: Intelligrated Headquarters, LLC, Mason, OH (US)

(*) Notice: Subject to any disclaimer, the term of this patent is extended or adjusted under 35 U.S.C. 154(b) by 161 days.

(21) Appl. No.: 18/764,846

(22) Filed: Jul. 5, 2024

(65) Prior Publication Data

US 2025/0026584 A1 Jan. 23, 2025

(30) Foreign Application Priority Data

Jul. 20, 2023 (IN) ............................ 202311048802

(51) Int. Cl.
*B65G 47/53* (2006.01)
*B65G 13/07* (2006.01)
*B65G 39/02* (2006.01)

(52) U.S. Cl.
CPC ............ *B65G 47/53* (2013.01); *B65G 13/07* (2013.01); *B65G 39/025* (2013.01)

(58) Field of Classification Search
CPC ...... B65G 13/07; B65G 13/10; B65G 39/025; B65G 47/53; B65G 47/54
USPC ........................................................ 198/779
See application file for complete search history.

(56) References Cited

U.S. PATENT DOCUMENTS

| | | | | |
|---|---|---|---|---|
| 3,679,043 | A * | 7/1972 | Becker | B65G 47/54 198/572 |
| 5,238,099 | A | 8/1993 | Schroeder et al. | |
| 9,365,361 | B1 | 6/2016 | Skarlupka | |
| 9,630,781 | B1 * | 4/2017 | Ogle, II | B65G 47/53 |

(Continued)

FOREIGN PATENT DOCUMENTS

| | | | |
|---|---|---|---|
| CN | 107777293 | A | 3/2018 |
| CN | 111591704 | A | 8/2020 |

(Continued)

OTHER PUBLICATIONS

US 2018/0257872 A1, Kuhn, Sep. 13, 2018.*
US 2020/0307921 A1, Kuhn, Oct. 1, 2020.*

*Primary Examiner* — Douglas A Hess
(74) *Attorney, Agent, or Firm* — Alston & Bird LLP

(57) ABSTRACT

Systems, methods, assemblies, and/or the like are provided. In some embodiments, a transfer system may include a first belt assembly having a first strip belt; a first active pulley, wherein the first active pulley is coupled to the first strip belt; a first driver, wherein the first driver is configured to drive the first active pulley in a first direction at a first power level, thereby driving the first strip belt; a second belt assembly having: a second strip belt; a second active pulley, wherein the second active pulley is coupled to the second strip belt; a second driver, wherein the second driver is configured to drive the second active pulley in a second direction at a second power level, thereby driving the second strip belt; and a plurality of balls comprising a shared diameter and disposed on or within a shared plane.

14 Claims, 12 Drawing Sheets

(56) References Cited

U.S. PATENT DOCUMENTS

| | | | | |
|---|---|---|---|---|
| 10,053,300 | B2 * | 8/2018 | Itoh | B65G 15/12 |
| 10,640,303 | B2 | 5/2020 | Kuhn | |
| 10,941,004 | B2 * | 3/2021 | Karol | B65G 13/10 |
| 11,247,849 | B2 | 2/2022 | Kuhn et al. | |
| 11,685,613 | B2 * | 6/2023 | Miyahara | B65G 47/54<br>193/36 |
| 11,787,643 | B2 * | 10/2023 | Namikawa | B65G 13/10<br>198/369.5 |
| 12,214,974 | B2 * | 2/2025 | Fike | B65G 47/643 |
| 12,297,053 | B2 * | 5/2025 | Tiwari | B65G 47/53 |
| 12,466,665 | B2 * | 11/2025 | Soundhararaj | B65G 47/53 |

FOREIGN PATENT DOCUMENTS

| | | | | |
|---|---|---|---|---|
| DE | 102017125981 | A1 * | 5/2019 | B65G 39/025 |
| GB | 2348631 | A * | 10/2000 | B65G 39/025 |
| WO | WO-2014142513 | A1 * | 9/2014 | B65G 39/025 |

* cited by examiner

TRANSFER SYSTEMS AND METHODS

CROSS-REFERENCE TO RELATED APPLICATIONS

This application claims priority pursuant to 35 U.S.C. 119 (a) to Indian Application No. 202311048802, filed Jul. 20, 2023, which application is incorporated herein by reference in its entirety.

TECHNICAL FIELD

The present disclosure relates generally to transfer systems. In particular, it relates to ball transfer systems for use in conveyors.

BACKGROUND

In industrial environments, transfer systems such as conveyors may be used to support and move one or more objects around the environment (e.g., a warehouse, a distribution center, etc.). A transfer system may be used to change the direction in which the object is traveling by moving the object from a conveyor going in one direction to a conveyor going in a different direction.

However, transfer systems may have complicated structures requiring specialized, auxiliary equipment (e.g., lifting mechanisms and/or the like), which results in inefficient and inconvenient operation. These systems may also be difficult to operate.

Through applied effort, ingenuity, and innovation, the Applicant has solved problems relating to transfer systems by developing solutions embodied in the present disclosure, which are described in detail below.

SUMMARY

In general, embodiments of the present disclosure provide systems, assemblies, methods and/or the like.

In accordance with various embodiments of the present disclosure, there is provided a transfer system including a first belt assembly including a first strip belt; a first active pulley, wherein the first active pulley is coupled to the first strip belt; a first driver, wherein the first driver is configured to drive the first active pulley in a first direction at a first power level, thereby driving the first strip belt; a second belt assembly including: a second strip belt; a second active pulley, wherein the second active pulley is coupled to the second strip belt; a second driver, wherein the second driver is configured to drive the second active pulley in a second direction at a second power level, thereby driving the second strip belt; and a plurality of balls having a shared diameter and disposed on or within a shared plane, wherein at least one of the plurality of balls is operably engaged with the first strip belt and configured to rotate in the first direction when the first driver drives the first active pulley, and wherein at least one of the plurality of balls is operably engaged with the second strip belt and configured to rotate in the second direction when the second driver drives the second active pulley.

In some embodiments, the first direction is orthogonal to the second direction.

In some embodiments, the first driver is a first motor driven roller (MDR) and the second driver is a second MDR.

In some embodiments, the first direction is defined at an angle relative to the second direction, the angle including 30 degrees, 45 degrees, or 60 degrees.

In some embodiments, the second belt assembly includes one or more second belt idler pulleys.

In some embodiments, the second strip belt is wrapped around the one or more second belt idler pulleys such that at least a first portion of the second strip belt is disposed below the one or more second belt idler pulleys and at least a second portion of the second strip belt is disposed above the one or more second belt idler pulleys.

In some embodiments, the second belt assembly further includes a bushing wrapped in a serpentine style around the one or more second belt idler pulleys.

In some embodiments, the transfer system includes a bed, wherein the plurality of balls are disposed on or within the bed.

In some embodiments, the bed includes one or more bed idler pulley disposed on or in one or more sides of the bed.

In some embodiments, the first belt assembly includes a first frame and the second belt assembly includes a second frame.

In some embodiments, the first belt assembly further includes one or more first belt idler pulleys.

In some embodiments, the transfer system is disposed at a junction point connecting a first conveyor traveling in the first direction and a second conveyor traveling in the second direction.

According to various embodiments, there is provided a belt assembly including a belt assembly having a strip belt; an active pulley, wherein the active pulley is coupled to the strip belt; a driver, wherein the driver is configured to drive the active pulley in a direction at a power level, thereby driving the strip belt; and one or more belt idler pulleys, wherein the strip belt is wrapped around the one or more belt idler pulleys such that at least a first portion of the strip belt is disposed below the one or more belt idler pulleys and at least a second portion of the strip belt is disposed above the one or more belt idler pulleys.

In some embodiments, the system includes a bushing wrapped in a serpentine style around the one or more belt idler pulleys.

In some embodiments, the driver is a motor driven roller (MDR).

According to various embodiments, there is provided a method of using a transfer system, the method including driving, by a first driver, at least one of a plurality of balls in a first direction at a first power level; driving, by a second driver, at least one of a plurality of balls in a second direction at a second power level; diverting, by the plurality of balls, one or more objects traveling along the first direction such that the one or more objects travel along the second direction.

The above summary is provided merely for purposes of summarizing some example embodiments to provide a basic understanding of some embodiments of the disclosure. Accordingly, it will be appreciated that the above-described embodiments are merely examples. It will be appreciated that the scope of the disclosure encompasses many potential embodiments in addition to those here summarized, some of which will be further described below.

BRIEF DESCRIPTION OF THE SEVERAL VIEWS OF THE DRAWING(S)

Having thus described the disclosure in general terms, reference will now be made to the accompanying drawings, which are not necessarily drawn to scale, and wherein:

DETAILED DESCRIPTION OF SOME EXAMPLE EMBODIMENTS

Figure 1:
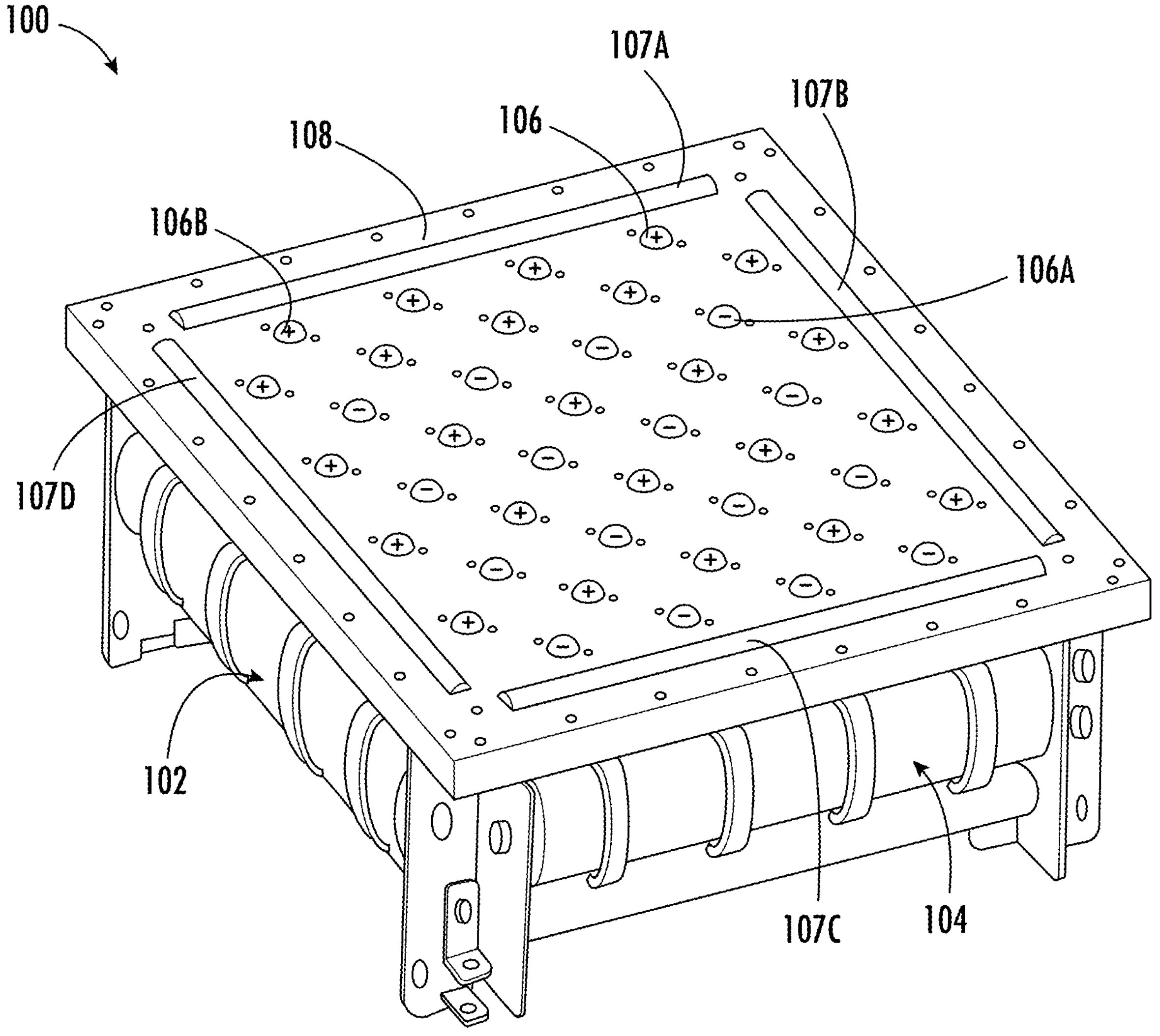
FIG. 1 shows an isometric view of an example transfer system in accordance with various embodiments of the present disclosure.

Various embodiments of the present disclosure now will be described more fully hereinafter with reference to the accompanying drawings, in which some, but not all embodiments of the disclosure are shown. Indeed, this disclosure may be embodied in many different forms and should not be construed as limited to the embodiments set forth herein; rather, these embodiments are provided so that this disclosure will satisfy applicable legal requirements. The term "or" (also designated as "/") is used herein in both the alternative and conjunctive sense, unless otherwise indicated. The terms "illustrative" and "exemplary" are used to be examples with no indication of quality level. Like numbers may refer to like elements throughout. The phrases "in one embodiment," "according to one embodiment," and/or the like generally mean that the particular feature, structure, or characteristic following the phrase may be included in at least one embodiment of the present disclosure and may be included in more than one embodiment of the present disclosure (importantly, such phrases do not necessarily may refer to the same embodiment).

Overview

According to various embodiments, there is provided a transfer system. In some embodiments, the transfer system may include a first belt assembly and a second belt assembly. The transfer system may also include a plurality of balls, configured to rotate in one or more directions. In some embodiments, the plurality of balls may be housed on or within a bed disposed above the first and second belt assemblies.

In some embodiments, the first and second belt assemblies may include first and second strip belts, respectively, configured to drive the plurality of balls in a first direction and a second direction, respectively. In some embodiments, the first and second belt assemblies may be powered by one or more motor driven rollers (MDRs). In some embodiments, the second strip belt may be wrapped around one or more idler pulleys in the second belt assembly. The second strip belt may be wrapped in a "serpentine" style around the one or more idler pulleys, such that the second strip belt is interwoven between the one or more idler pulleys. In some embodiments, the first and second strip belts may be coupled to first and second active pulleys, respectively, which are powered by the one or more MDRs.

In some embodiments, the transfer system may be connected to one or more conveyors traveling in one or more directions. For example, a transfer system may be placed at a junction point between two conveyors: a first conveyor going in a first direction and a second conveyor going in a second direction, lateral to the first direction; an object may be traveling on the first conveyor in the first direction and the transfer system may transfer the object such that it is traveling on the second conveyor in the second direction.

In some embodiments, MDRs may be varied in power to control the speed of rotation for the plurality of balls, thereby causing some of the balls to rotate more rapidly in one direction. In at least this way, the transfer system may transfer objects at varying angles. Hence, by varying the power of the MDRs, the transfer system may move objects between multiple conveyor belts disposed at multiple different angles relative to each other.

Example Transfer Systems

FIG. 1 shows an isometric view of an example transfer system 100, according to various embodiments. The transfer system 100 may include one or more belt assemblies configured to transfer one or more objects in one or more directions. In some embodiments, the transfer system 100 may include a first belt assembly 102 and a second belt assembly 104. The first and second belt assemblies 102, 104 may be configured to transfer the one or more objects in a first and second directions, respectively, as will be described in greater detail later in this disclosure.

Figure 2A:
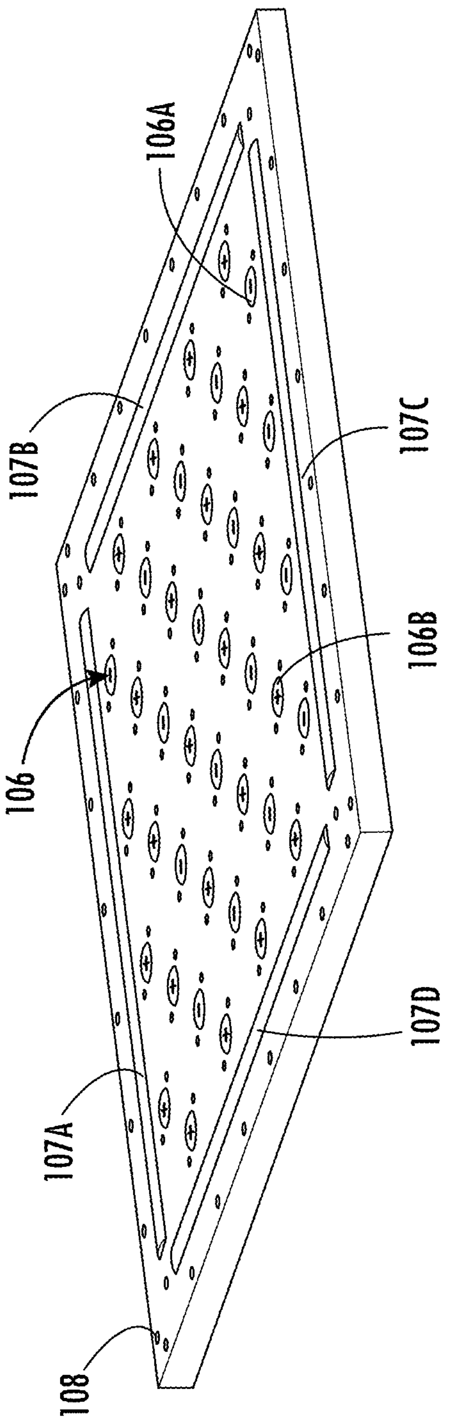
FIG. 2A shows a bed of an example transfer system in accordance with various embodiments of the present disclosure.

In some embodiments, and referring now to FIG. 2A as well as FIG. 1, the transfer system 100 may include a plurality of balls 106 and a bed 108. In some embodiments, the plurality of balls 106 may be disposed on or within the bed 108. The balls 106 may be substantially spherical, plastic and/or metal balls. The balls 106 may be spheres having a uniform diameter. It will be understood that the diameters of the balls 106 may be increased or decreased as necessary or desired for transporting various objects using the system 100. For example, larger balls may be used for larger packages. In some embodiments, the bed 108 may be a rectangular, planar bed. In some embodiments, the bed 108 may include one or more slots and/or the like configured to hold the balls 106. The slots may be sized such that the plurality of balls 106 may rotate omnidirectionally within the slots while not leaving the slots. In some embodiments, the plurality of balls 106 may have the same size and dimensions. In some embodiments, the plurality of balls 106 may all be disposed within the same plane of space.

Referring again to FIG. 1, in some embodiments, the plurality of balls 106 and the bed 108 may be disposed above the first and second belt assemblies 102, 104. In some embodiments, at least some of the plurality of balls 106A may be engaged with one or more components of the first belt assembly 102 and at least some of the plurality of balls 106B may be engaged with one or more components of the second belt assembly 104.

In some embodiments, the bed may include one or more bed idler bed rollers 107A, 107B, 107C and 107D. In some embodiments the one or more bed idler rollers 107A-D may be configured to rotate on or within the bed 108 in one or more directions. In some embodiments, the one or more bed idler rollers 107A-D may be rotated in different directions. For example, a first bed idler roller 107A may rotate in a first direction while a second bed idler roller 107B rotates in a second direction. In some embodiments, the one or more bed idler rollers 107A-D may be configured to rotate at multiple speeds. In some embodiments, the one or more bed idler rollers 107A-D may be engaged with one or more components of the first belt assembly 102 and/or the second belt assembly 104.

Figure 2B:
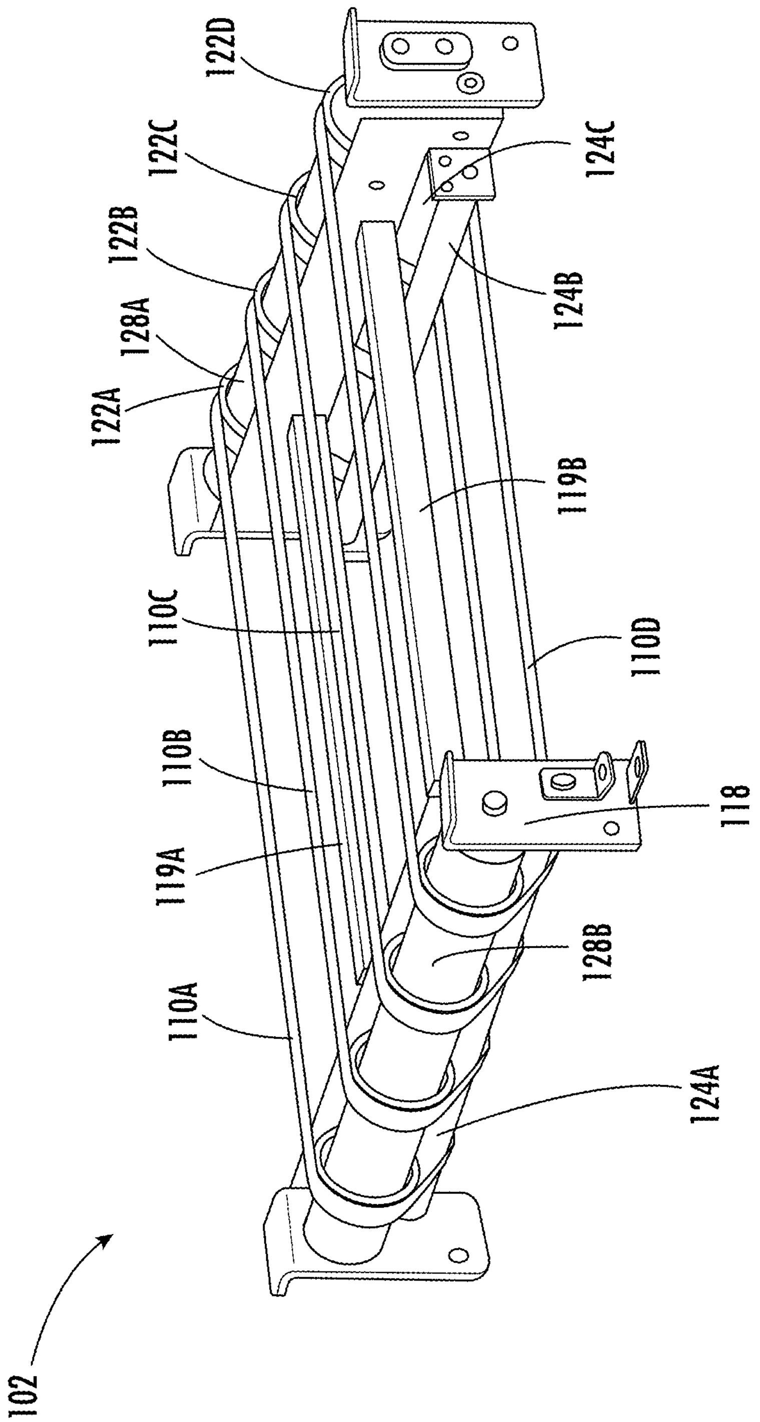
FIGS. 2B and 2C shows isometric views of example belt assemblies of an example transfer system in accordance with various embodiments of the present disclosure.

Referring now to FIG. 2B, in some embodiments, the first belt assembly 102 may include a first frame 118. In some embodiments, the first frame 118 may be a substantially metal, rectangular frame configured to house or include one or more components. One or more components of the first belt assembly 102 may be operably attached to or engaged with the first frame 118. In some embodiments, the first belt assembly 102 may be disposed above the second belt assembly 104 within the system 100.

In some embodiments, the first belt assembly 102 may include one or more first frame support beams 119A, 119B. The first frame support beams 119A-B may be disposed within the frame 118 and may be configured to support one or more components of the first belt assembly 102 and/or the system 100.

In some embodiments, the first belt assembly 102 may include a first driver 128A. In some embodiments, the first driver 128A may be a first motor driven roller (MDR) 128A. In some embodiments, the first MDR 128A may be configured to drive one or more components of the first belt assembly 102. In some embodiments, the first MDR 128A may be coupled to a first passive roller 128B. The first MDR 128A and the first passive roller 128B may be substantially cylindrical rollers configured to rotate in synchronization with one another. In some embodiments, the power of the first MDR 128A may be varied to control the speed of rotation of the first MDR 128A (and, by extension, the first passive roller 128B. In some embodiments, the first MDR 128A may be controlled by an MDR control card and/or one or more programmable logic controllers (PLCs).

In some embodiments, the first belt assembly 102 may include one or more first strip belts 110A, 110B, 110C, and 110D. The one or more first strip belts 110A-D may be attached to the frame 118 or operably engaged with one or more components of the frame 118. In some embodiments, the one or more first strip belts 110A-D may be substantially elastic belts arranged in parallel with one another. In some embodiments, the one or more first strip belts 110A-D may be disposed perpendicularly to the first MDR 128A and/or the first passive roller 128B. In some embodiments, the first strip belts 110A-D may be parallel with the first frame support beams 119A-B.

In some embodiments, the first strip belts 110A-D may be operably engaged to both the first MDR 128A and the first passive roller 128B and configured to transfer motion from the first MDR 128A to the first passive roller 128B, such that rotation of the first MDR 128A causes rotation of the first passive roller 128B. In some embodiments the one or more first strip belts 110A-D may be disposed in one or more shared planes. For example, one or more top sides (i.e., sides that are above the first MDR 128A) of the first strip belts 110A-D may be disposed in the same plane and one or more bottom sides (i.e., sides that are below the first MDR 128A) of the first strip belts 110A-D may be disposed in the same plane. Though four first strip belts 110A-D are shown in the various figures, it will be understood that greater or fewer than four strip belts 110A-D may be used, depending on the needs of the system 100.

In some embodiments, the first belt assembly 102 may include one or more first active pulleys 122A, 122B, 122C, 122D. In some embodiments, the first active pulleys 122A-D may be disposed on the first MDR 128A. In some embodiments, the first active pulleys 122A-D may be configured to connect the first MDR 128A and the first active pulleys 122A-D. The first active pulleys 122A-D may be configured to transfer motion from the first MDR 128A to the first strip belts 110A-D.

In some embodiments, the first belt assembly 102 may include one or more first idler pulleys 124A, 124B, and 124C. The one or more first idler pulleys 124A-C may be disposed beneath the first MDR 128A and the first passive roller 128B. One or more of the first idler pulleys 124A-C may be engaged with one or more of the first strip belts 110A-D. The one or more first idler pulleys 124A-C may be configured to rotate with the first strip belts 110A-D.

Figure 2C:
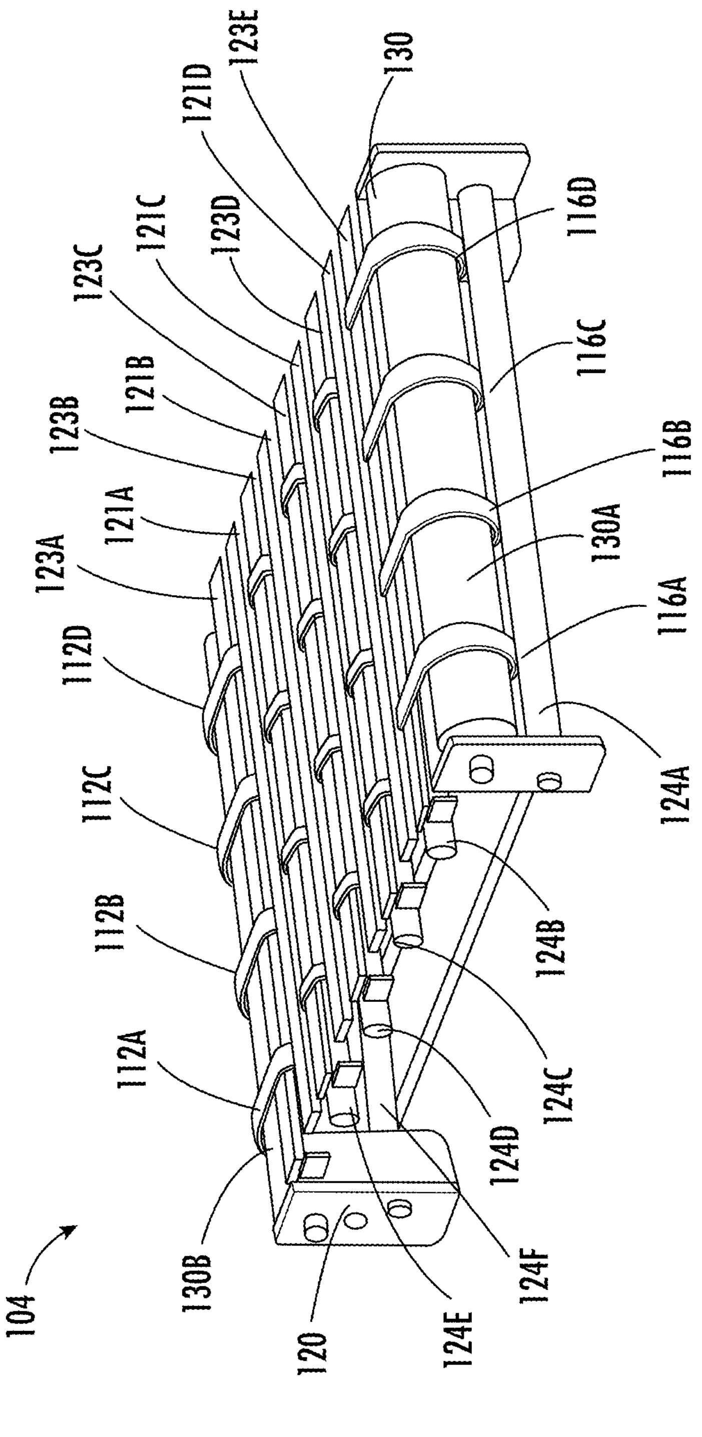
Figure 3A:
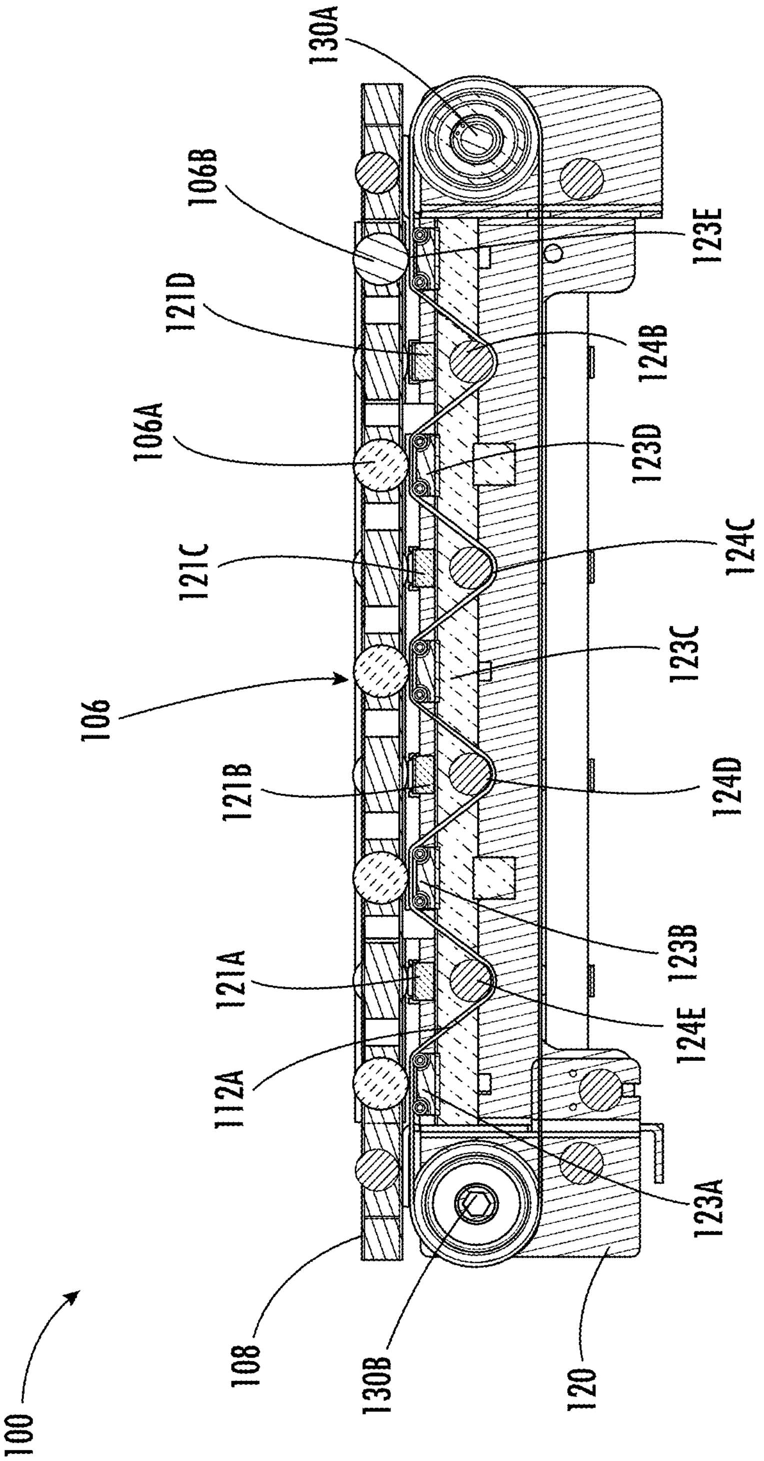
FIG. 3A shows an elevation side view of an example transfer system in accordance with various embodiments of the present disclosure.
Figure 3B:
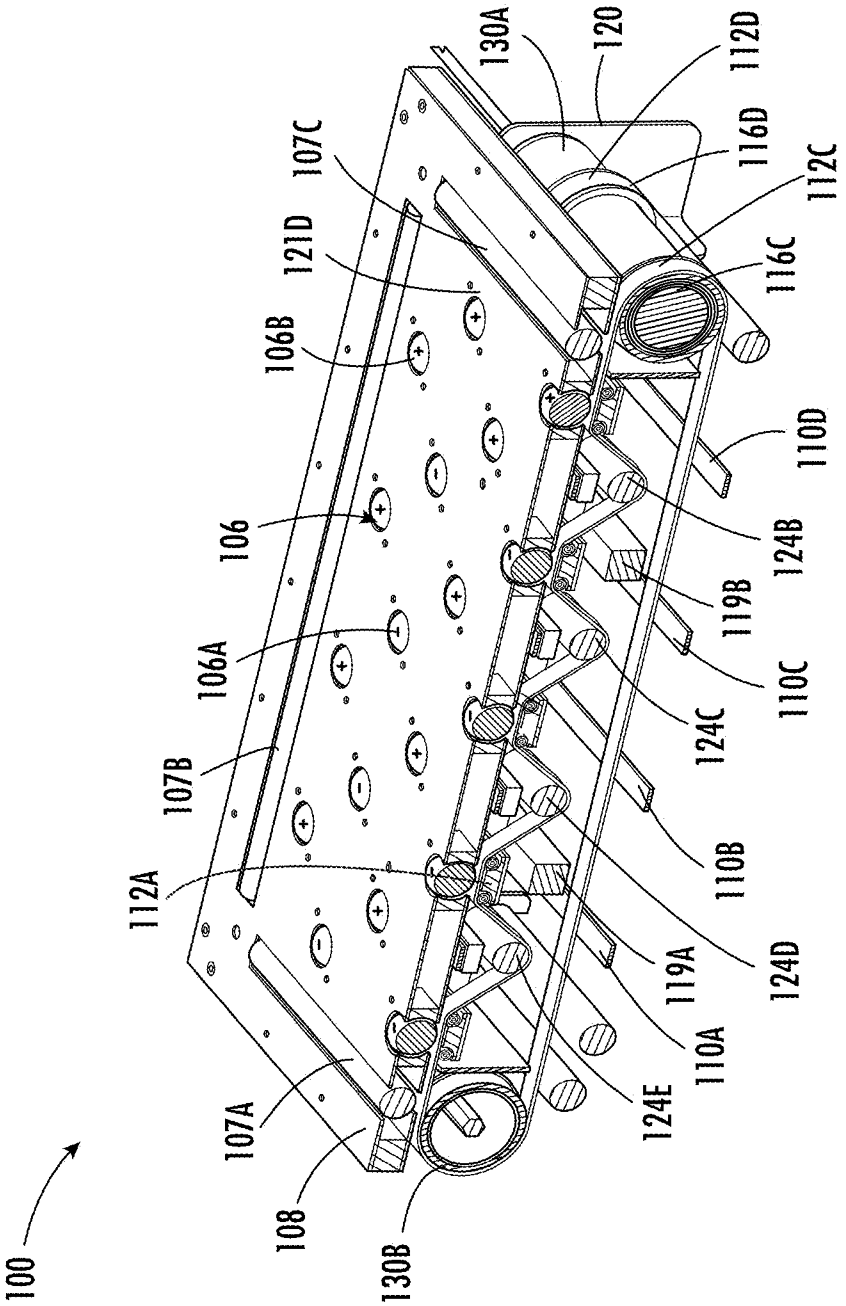
FIG. 3B shows a cross-sectional isometric view of an example transfer system in accordance with various embodiments of the present disclosure.
Figure 4:
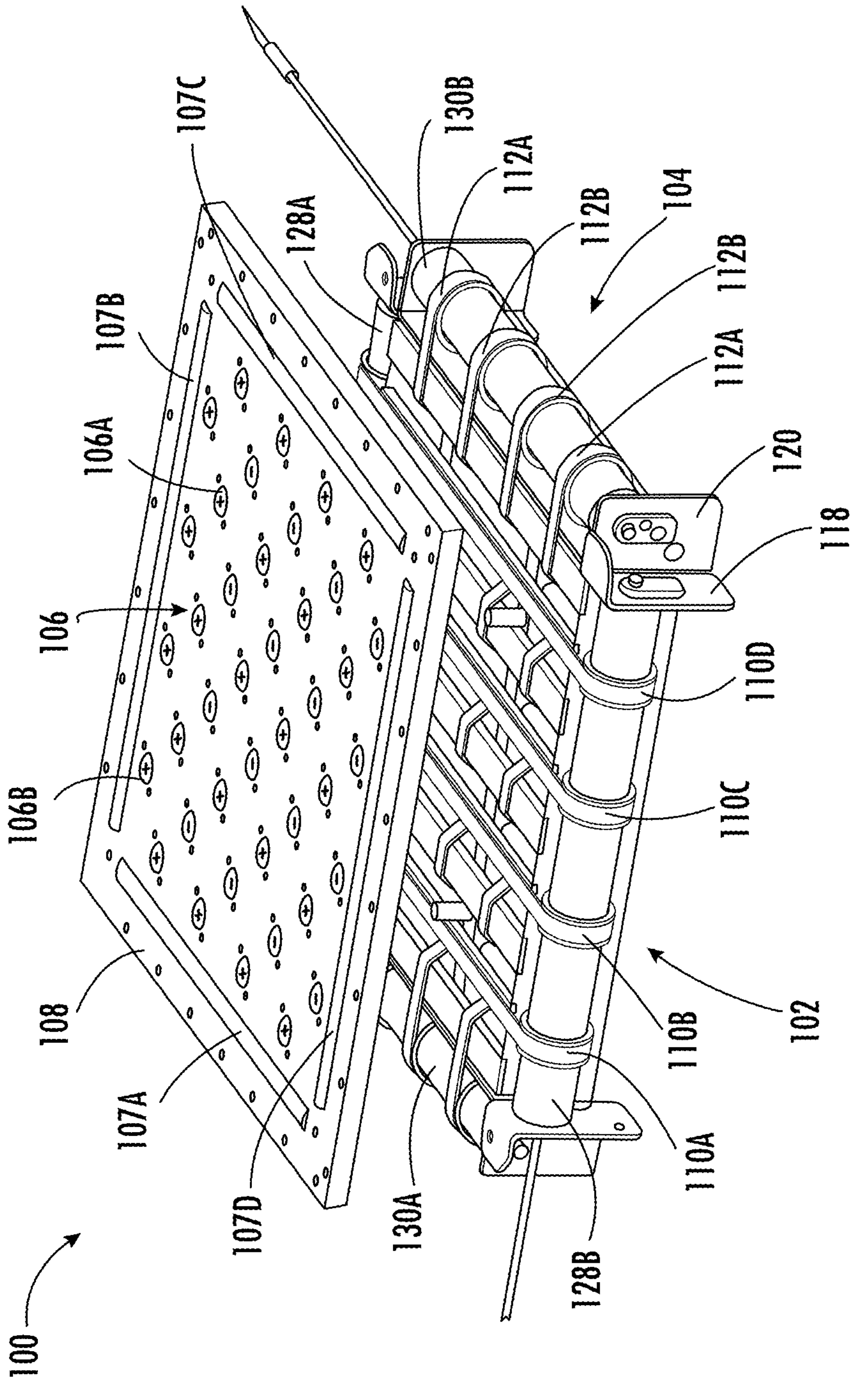
FIG. 4 shows an exploded view of an example transfer system in accordance with various embodiments of the present disclosure.
Figure 5:
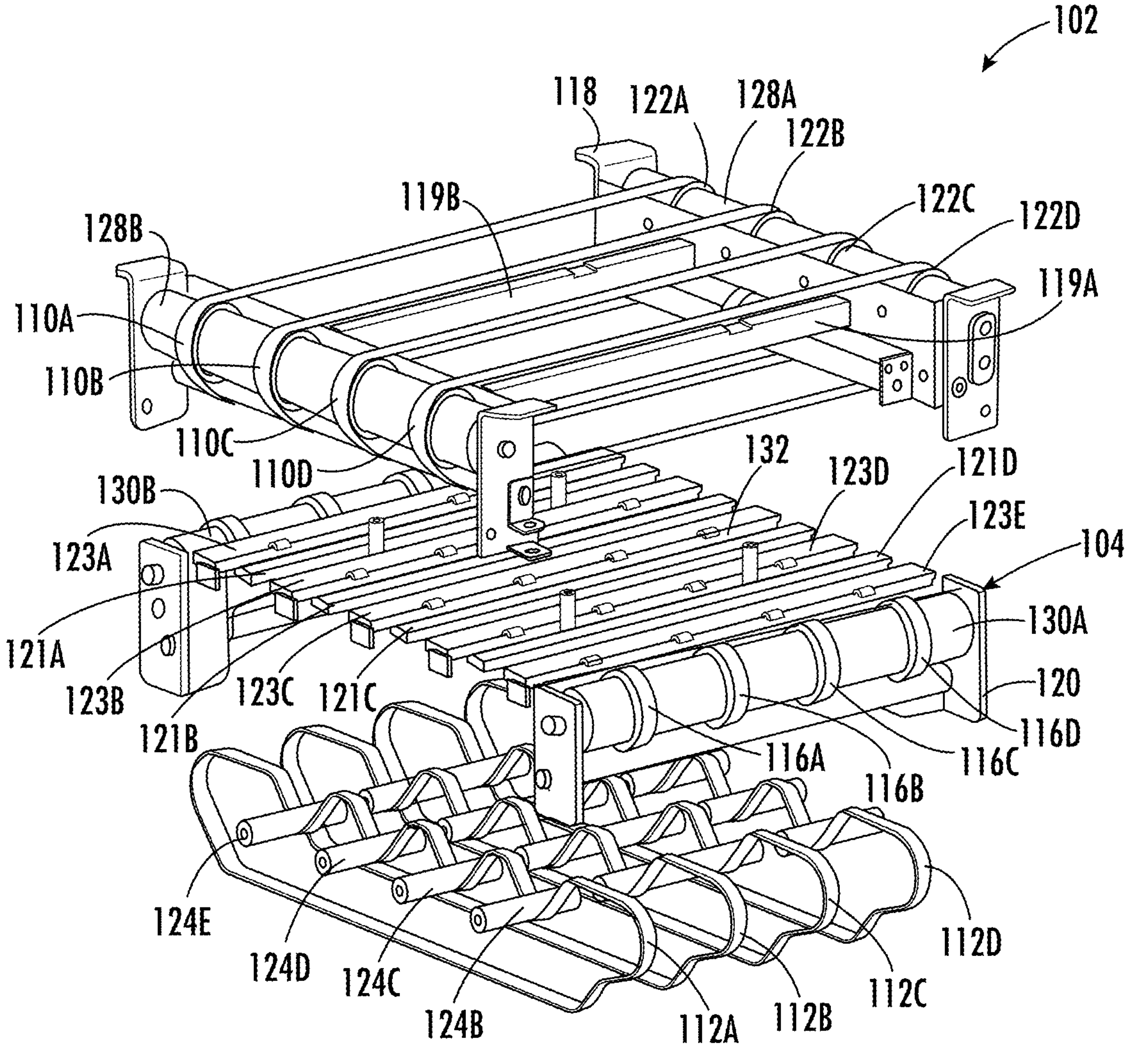
FIG. 5 shows an exploded view of an example transfer system in accordance with various embodiments of the present disclosure.

Referring now to FIG. 2C, but also to FIGS. 3A-3B, 4, and 5, in some embodiments, the second belt assembly 104 may include a second frame 120. The second frame 120 may be substantially rectangular, metallic frame. According to various embodiments, the second frame 120 may be described similar to the frame 118 of the first belt assembly 102. In some embodiments, the first frame 118 and second frame 120 may be configured to fit together and be disposed within the same plane, as will be described in greater detail later in this disclosure.

In some embodiments, the second belt assembly 104 may include a second driver 130A. In some embodiments, the second driver 130A may be a second motor driven roller (MDR) 130A configured to drive one or more components of the second belt assembly 104. In some embodiments, the second MDR 130A may be coupled to a second passive roller 130B and configured to be driven by the second MDR 130A. It will be understood that the second MDR 130A may be described similarly to the first MDR 128A, and the second passive roller 130B may be described similarly to the first passive roller 128B. The second MDR 130A may be controlled similarly to the first MDR 128A (i.e., by an MDR control card and/or one or more PLCs.

In some embodiments, the second belt assembly 104 may include one or more second frame support beams 121A-D and one or more second frame support shafts 123A-E. In some embodiments, the one or more second frame support beams 121A-D and shafts 123A-E may be configured to support one or more elements of the first and/or second belt assemblies 102, 104, and/or the system 100. The one or more second frame support beams 121A-D and shafts 123A-E may be disposed in parallel and/or be parallel to the second MDR 130A and/or the second passive roller 130B.

In some embodiments, the second belt assembly 104 may include one or more second idler pulleys 126A-F. The one or more idler pulleys 126A-F may be described similarly to the one or more first idler pulleys 124A-C of the first belt assembly 102.

In some embodiments, the second belt assembly 104 may include one or more second strip belts 112A, 112B, 112C, and 112D. According to various embodiments, the one or more second strip belts 112A-D may be similar to the first strip belts 110A-D and may be described similarly to the first strip belts 110A-D. In some embodiments, the one or more second strip belts 112A-D may be arranged in a "serpentine" style; that is, the one or more second strip belts 112A-D may be disposed above and/or below the one or more idler pulleys 126A-F. In at least this way, the second strip belts 112A-D may be configured to drive smoothly from the second MDR 130A.

In some embodiments, the second belt assembly 104 may include one or more second active pulleys 116A, 116B, 116C, and 116D. The one or more second active pulleys 116A-D may be disposed on the second MDR 128B. It will be understood that the description of the first active pulleys 122A-D may apply similarly to the second active pulleys 116A-D. For example, the second active pulleys 116A-D may be operably engaged with the second strip belts 112A-D and configured to drive the second strip belts 112A-D.

In some embodiments, the second belt assembly 104 may include one or more bushings 132. The one or more bushings 132 may be disposed on or within the one or more second frame support beams 121A-D and/or the second frame support shafts 123A-E and configured to act as bearings for at least the second strip belts 112A-D when they are driven by the second MDR 130A.

Figure 6:
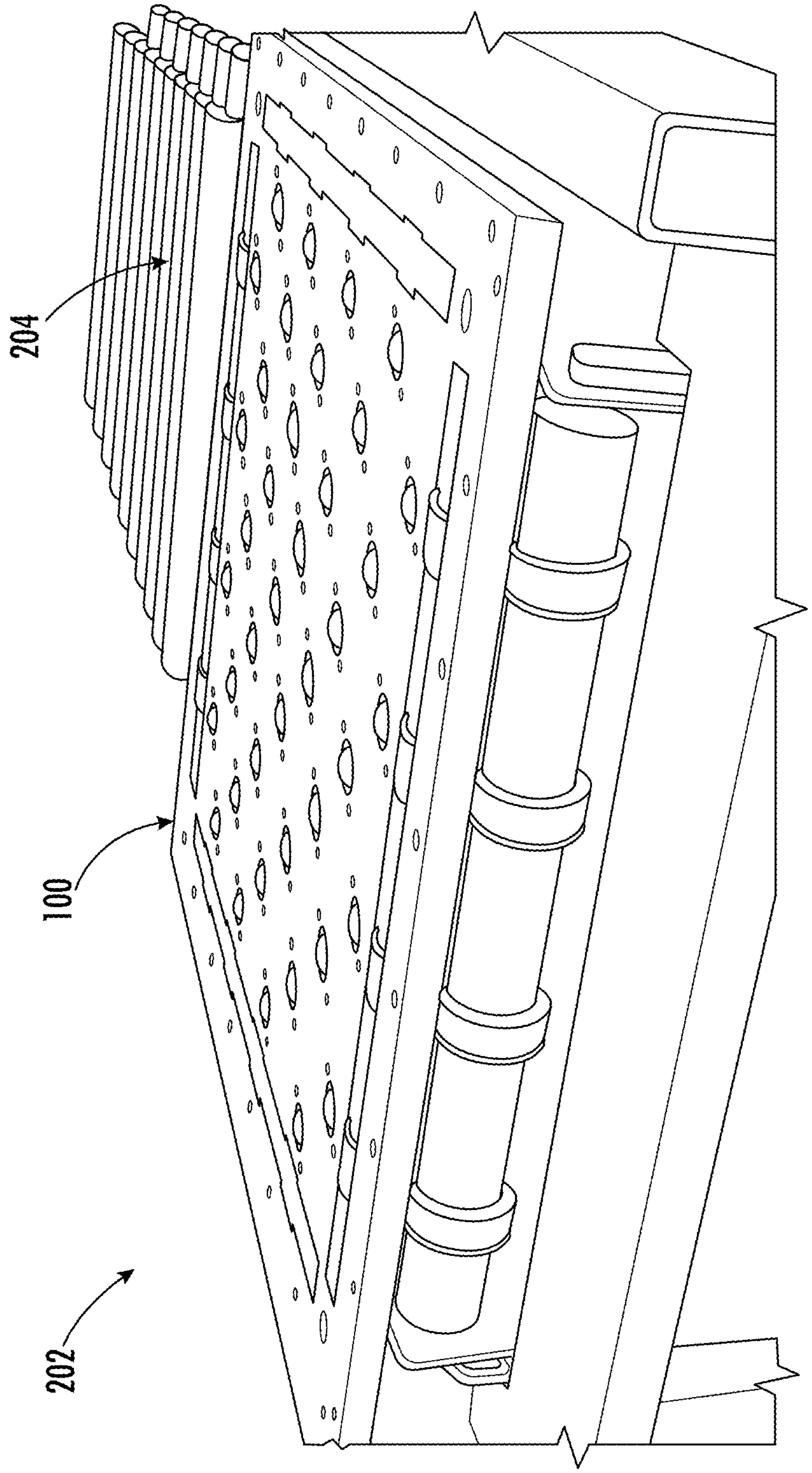
FIG. 6 show an example transfer system and example conveyors in accordance with various embodiments of the present disclosure.

Referring now to FIG. 6, in some embodiments, the transfer system 100 may be disposed at a junction point between a first conveyor 202 and a second conveyor 204. In some embodiments, the first conveyor 202 may be traveling in a first direction (also known as a primary flow) and the second conveyor (also known as a secondary flow) may be traveling in a second direction 204, as indicated by the arrows. In some embodiments, the first belt assembly 102 may be aligned substantially with the first conveyor such that the first MDR 128A drives in the first direction and the second belt assembly 104 may be aligned substantially with the second conveyor such that the second MDR 130A drives in the second direction. In some embodiments, the first MDR 128A and the second MDR 130A may be configured to be driven in reverse; that is, the first MDR 128A may be driven in the opposite of the first direction and the second MDR 130A may be driven in the second direction. In at least this way, the first and second MDRs 128A, 130A may enable objects to travel along the entire length of both conveyors 202, 204. The transfer system 100 may be configured to change the direction of one or more objects traveling along the first direction to the second direction, via control of the first and/or second MDRs 128A, 130A.

Figure 7A:
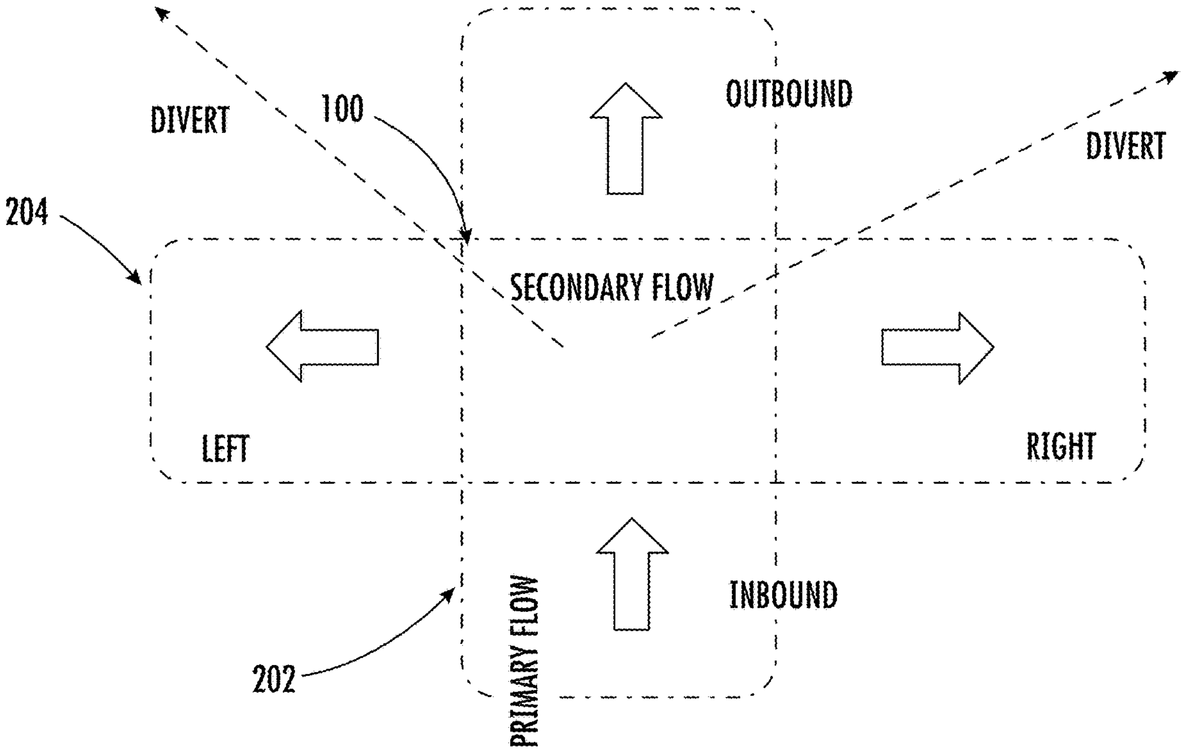
FIGS. 7A-7B show top plan views of an example transfer system in accordance with various embodiments of the present disclosure.
Figure 7B:
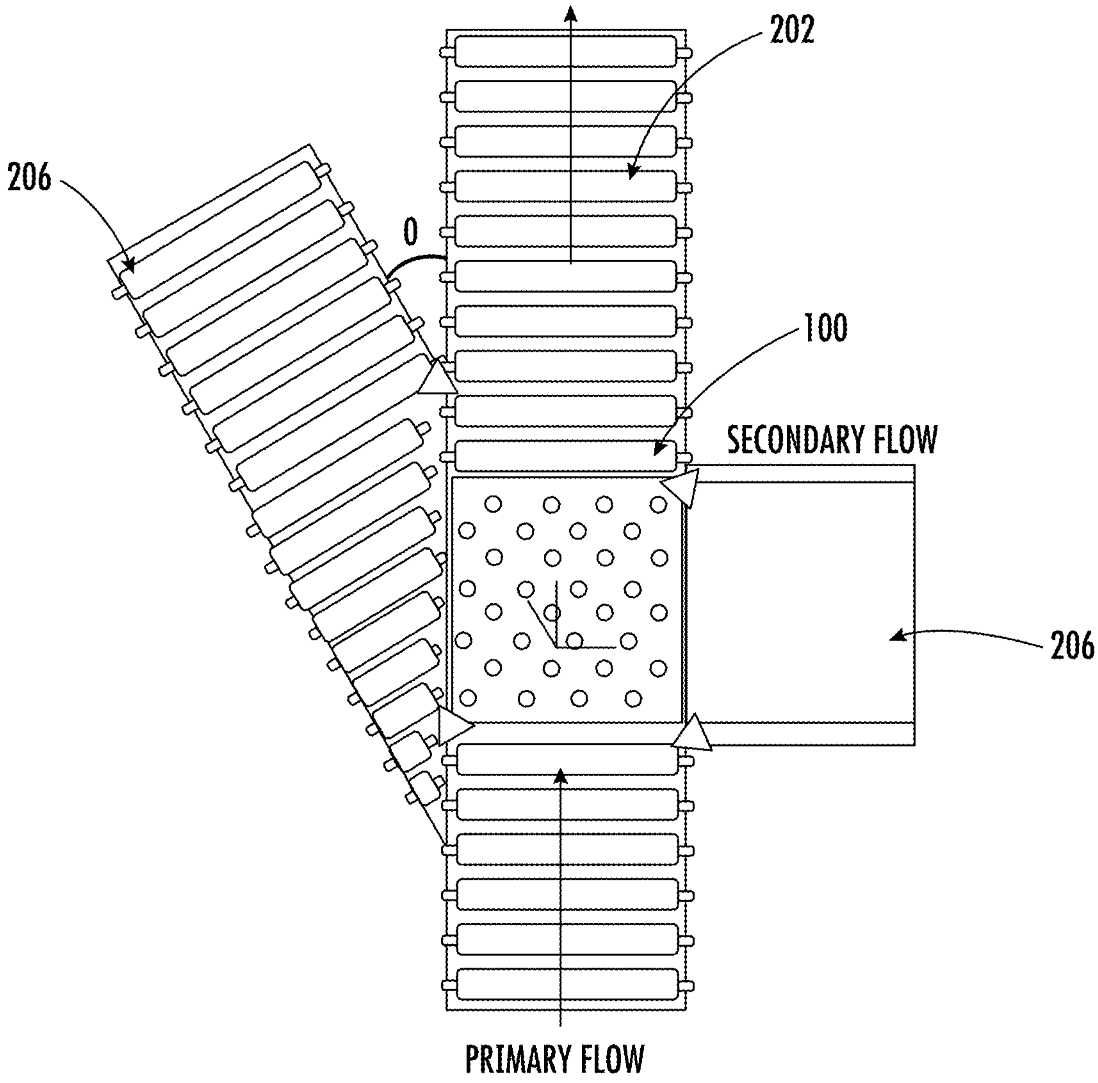

Referring now to FIGS. 7A-7B, according to various embodiments, there are provided top plan views of an example transfer system 100 and illustrates various means by which the direction of one or more objects traveling along the first and/or second conveyor 202, 204. In some embodiments, and as previously described, the first belt assembly 102 may be aligned along the first conveyor 202 and the second belt assembly 104 may be aligned along the second conveyor 204.

As shown in FIG. 7A, an example transfer system 100 may be disposed at a junction point between the first conveyor 202 and the second conveyor 204 as in FIG. 6. In some embodiments, an object traveling along the first conveyor 202 may be considered to travel along a "primary flow" direction. In some embodiments, an object traveling along the second conveyor 204 may be considered traveling along a "secondary flow" direction. As previously described with reference to at least FIG. 6, the In some embodiments, there may be one or more "divert" paths disposed between the primary and secondary flow paths. In some embodiments, the power levels of the first and/or second MDRs 128A, 130A of the transfer system 100 may be varied such that the object is diverted from the primary flow and the second flow. For example, for an object to travel along one of the divert paths, the first MDR 128A may be powered at twice the rate of the second MDR 130A, such that the object travels along one of the divert paths.

As shown in FIG. 7B, an example transfer system 100 may be disposed at a junction point between the first conveyor 202, the second conveyor 204, and a third conveyor 206, disposed at a divert angle θ from the first conveyor 202. As previously described, the power levels of the first MDR 128A and the second MDR 130A may be varied to enable one or more objects travelling along the first or second conveyors 202, 204 to be transferred to travel along the third conveyor 206.

Example Methods of Using Transfer Systems

Figure 8:
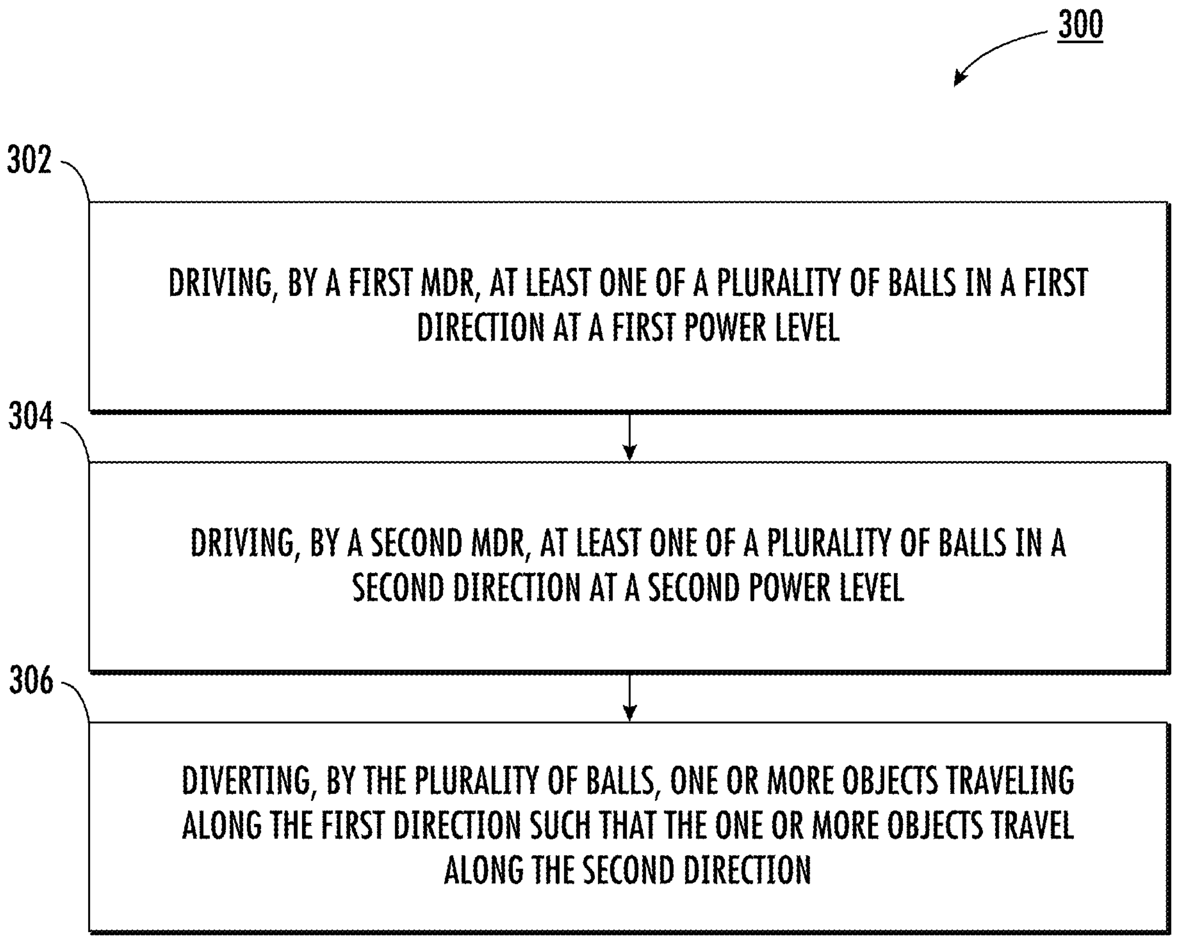
FIG. 8 shows an example flow chart illustrating an example method of using an example transfer system in accordance with various embodiments of the present disclosure.

FIG. 8 is an example method 300 of using an example transfer system. The method 300 is described with reference to the system 100, as well as the first and second conveyors 202, 204. The method 300 may also be implemented on any number of suitable apparatuses and systems, as desired.

In some embodiments, the method 300 may include a first step 302 of driving, by a first motor driven roller (MDR), at least one of a plurality of balls in a first direction at a first power level.

In some embodiments, the method 300 may include a second step 304 of driving, by a second MDR, at least one of a plurality of balls in a second direction at a second power level.

In some embodiments, the method 300 may include a third step 306 of diverting, by the plurality of balls, one or more objects traveling along the first direction such that the one or more objects travel along the second direction.

Many modifications and other embodiments of the disclosure set forth herein will come to mind to one skilled in the art to which this disclosure pertains having the benefit of the teachings presented in the foregoing descriptions and the associated drawings. Therefore, it is to be understood that the disclosure is not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A transfer system comprising:

a first belt assembly comprising:
- a first strip belt;
- a first active pulley, wherein the first active pulley is coupled to the first strip belt;
- a first driver, wherein the first driver is configured to drive the first active pulley in a first direction at a first power level, thereby driving the first strip belt;

a second belt assembly comprising:
- a second strip belt;
- a second active pulley, wherein the second active pulley is coupled to the second strip belt;
- a second driver, wherein the second driver is configured to drive the second active pulley in a second direction at a second power level, thereby driving the second strip belt;

a plurality of balls comprising a shared diameter and disposed on or within a shared plane, wherein at least one of the plurality of balls is operably engaged with the first strip belt and configured to rotate in the first direction when the first driver drives the first active pulley, wherein at least one of the plurality of balls is operably engaged with the second strip belt and configured to rotate in the second direction when the second driver drives the second active pulley; and a bed, wherein the plurality of balls are disposed on or within the bed, wherein the bed comprises one or more bed idler pulley disposed on or in one or more sides of the bed.

2. The transfer system of claim 1, wherein the first direction is orthogonal to the second direction.

3. The transfer system of claim 1, wherein the first driver is a first motor driven roller (MDR), and wherein the second driver is a second MDR.

4. The transfer system of claim 1, wherein the first direction is defined at an angle relative to the second direction.

5. The transfer system of claim 4, wherein the angle comprises 30 degrees, 45 degrees, or 60 degrees.

6. The transfer system of claim 1, wherein the second belt assembly further comprises one or more second belt idler pulleys.

7. The transfer system of claim 6, wherein the second strip belt is wrapped around the one or more second belt idler pulleys such that at least a first portion of the second strip belt is disposed below the one or more second belt idler pulleys and at least a second portion of the second strip belt is disposed above the one or more second belt idler pulleys.

8. The transfer system of claim 7, wherein the second belt assembly further comprises a bushing wrapped in a serpentine style around the one or more second belt idler pulleys.

9. The transfer system of claim 1, wherein the first belt assembly further comprises a first frame and wherein the second belt assembly further comprises a second frame.

10. The transfer system of claim 1, wherein the first belt assembly further comprises one or more first belt idler pulleys.

11. The transfer system of claim 1, wherein the transfer system is disposed at a junction point connecting a first conveyor traveling in the first direction and a second conveyor traveling in the second direction.

12. A belt assembly comprising:

a strip belt;

an active pulley, wherein the active pulley is coupled to the strip belt;

a driver, wherein the driver is configured to drive the active pulley in a direction at a power level, thereby driving the strip belt;

one or more belt idler pulleys, wherein the strip belt is wrapped around the one or more belt idler pulleys such that at least a first portion of the strip belt is disposed below the one or more belt idler pulleys and at least a second portion of the strip belt is disposed above the one or more belt idler pulleys; and a bushing wrapped in a serpentine style around the one or more belt idler pulleys.

13. The belt assembly of claim 12, wherein the driver comprises a motor driven roller (MDR).

14. A method of using a transfer system, the method comprising:

driving, by a first driver, at least one of a plurality of balls in a first direction at a first power level;

driving, by a second driver, at least one of a plurality of balls in a second direction at a second power level; and diverting, by the plurality of balls, one or more objects traveling along the first direction such that the one or more objects travel along the second direction, wherein the transfer system comprises a bed, wherein the plurality of balls are disposed on or within the bed, and wherein the bed comprises one or more bed idler pulley disposed on or in one or more sides of the bed.

* * * * *